(No Model.)
H. G. DENNIS.
BELL JOINT FOR COUPLING PIPES.
No. 246,092. Patented Aug. 23, 1881.
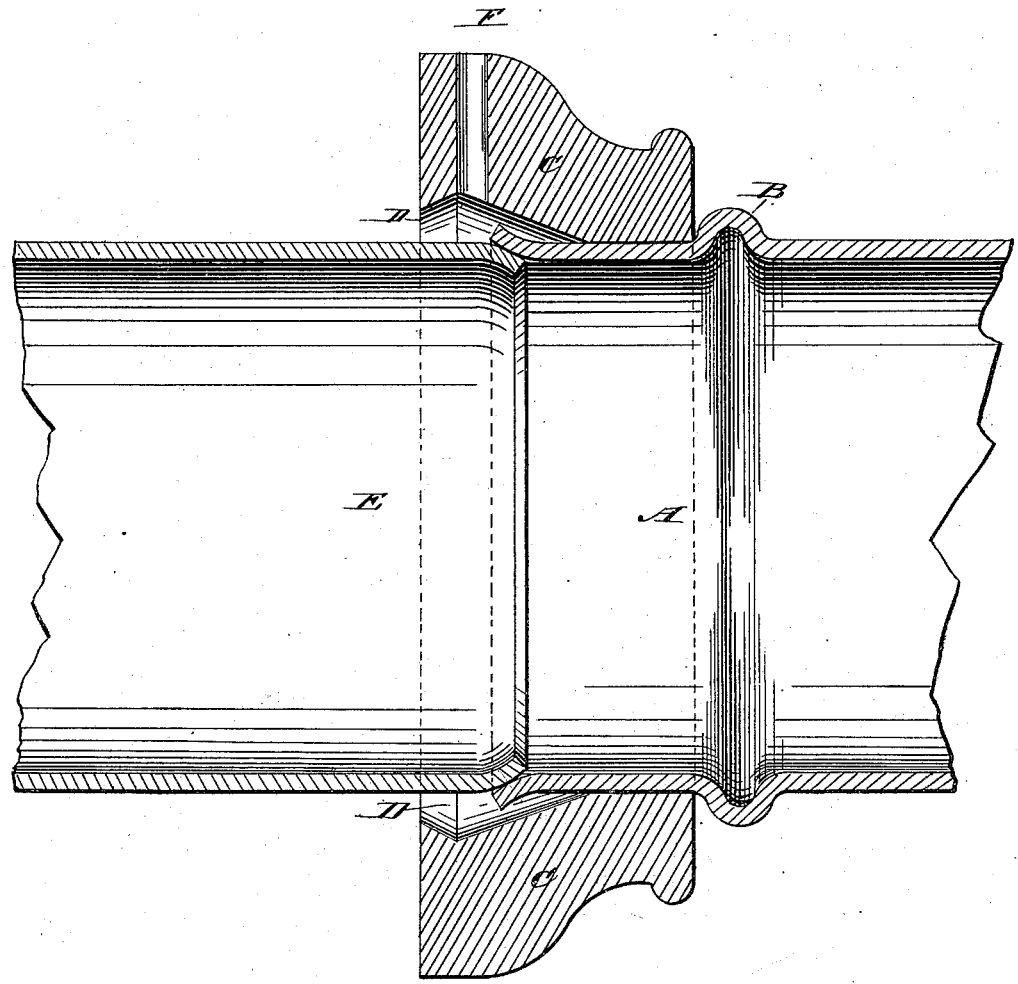
WITNESSES:
Francis McArdle.
B. G. Underwood.
INVENTOR:
H. G. Dennis
BY Munn &Co
ATTORNEYS.

UNITED STATES PATENT OFFICE.

HENRY G. DENNIS, OF NEW BEDFORD, MASSACHUSETTS, ASSIGNOR TO FOSTER S. DENNIS, OF SAME PLACE.

BELL-JOINT FOR COUPLING PIPES.

SPECIFICATION forming part of Letters Patent No. 246,092, dated August 23, 1881.

Application filed June 22, 1881. (No model.)

To all whom it may concern:

Be it known that I, HENRY G. DENNIS, of New Bedford, Bristol county, Massachusetts, have invented a new and Improved Bell-Joint for Coupling Pipes, of which the following is a specification.

The invention consists in a rabbeted collar mounted on the end of a pipe and resting against an annular bead near the end of the same, which pipe is swaged out to receive the contracted end of the other pipe, upon which molten lead is poured through an aperture in the top of the collar to fill the space between the inner surface of the collar and the pipes, a clay roll having been previously placed against the open end of the collar.

In the accompanying drawing a longitudinal sectional elevation of the ends of two pipes united by my improved bell-joint is represented.

The pipe A is provided with an external annular bead, B, a short distance from the end, and a beveled cast-iron bell or collar, C, with a rabbet, D, in its inner surface, is mounted on this end of the pipe, and the inner end or edge of this collar is driven against the annular bead B, as shown. The end of the pipe A is then swaged outward and the end of its fellow or opposite pipe, E, is contracted, so that it can be driven or passed a short distance into the swaged end of the pipe A. A clay roll is then placed against the outer end of the collar C, and molten metal is poured through the aperture F of the collar C in the annular space between the inner surface of the collar C and the outer surface of the pipes A and E, and the joint is then well calked.

The pipes are provided at one end with the bead B at the works; but the pipes and collars are shipped separately, and are only united when the two pipes are to be joined.

With the construction of parts as described above a very tight and close joint is obtained, for the lead poured into the space between the collar and the pipes completely covers the line of contact of the pipes. As the collar C is pressed firmly against the bead B, and is held in this position by the lead between the collar and the pipes, all leaks at the rear end of this collar are prevented.

By pouring the molten lead through the aperture F there is a certainty of having the space between the collar and the pipe filled completely, and turning, raising, or dropping the pipes is avoided and prevented.

Having thus described my invention, I claim as new and desire to secure by Letters Patent—

1. In a pipe-joint, the combination, with the pipe A, having an annular bead, B, near the end, and with the pipe E, of the collar or bell C, substantially as herein shown and described, and for the purpose set forth.

2. In a pipe-joint, the combination, with the pipe A, provided with an annular bead and swaged outward at the end, and the pipe E, contracted at the end, of a collar or bell, C, substantially as herein shown and described, and for the purpose set forth.

3. In a pipe-joint, a removable beveled bell or collar, C, made substantially as herein shown and described, with rabbet D, and an aperture, F, extending from the outer to the inner surface, as and for the purpose set forth.

HENRY GILES DENNIS.

Witnesses:
CHARLES E. PARKER,
C. A. THOMPSON.